United States Patent [19]

Mack

[11] Patent Number: 5,053,963
[45] Date of Patent: Oct. 1, 1991

[54] AMT CRUISE CONTROL MODE SHIFT LOGIC

[75] Inventor: William J. Mack, Clarkston, Mich.

[73] Assignee: Eaton Corporation, Cleveland, Ohio

[21] Appl. No.: 559,794

[22] Filed: Jul. 30, 1990

[51] Int. Cl.$^5$ .............................................. B60K 41/04
[52] U.S. Cl. ............................ 364/424.1; 364/426.04; 74/866; 180/170
[58] Field of Search ............... 364/426.04, 424.1; 74/866, 862, 858, 859; 180/170, 179

[56] References Cited

U.S. PATENT DOCUMENTS

| | | | |
|---|---|---|---|
| 4,361,060 | 11/1982 | Smyth | 74/866 |
| 4,551,802 | 11/1985 | Smyth | 364/424.1 |
| 4,576,065 | 3/1986 | Speranza et al. | 74/866 |
| 4,845,621 | 7/1989 | Kawata et al. | 364/426.04 |
| 4,852,006 | 7/1989 | Speranza | 364/424.1 |
| 4,905,786 | 3/1990 | Miyake et al. | 364/426.04 |
| 4,937,749 | 6/1990 | Dunkley et al. | 364/424.1 |
| 4,938,604 | 7/1990 | Naito et al. | 364/426.04 |
| 4,939,657 | 7/1990 | Imai et al. | 364/426.04 |
| 4,967,358 | 10/1990 | Etoh | 364/426.04 |

*Primary Examiner*—Parshotam S. Lall
*Assistant Examiner*—Gary D. Yacura
*Attorney, Agent, or Firm*—H. D. Gordon

[57] ABSTRACT

An improved control system and method for an automatic mechanical transmission system (10) having an operator selectable (44A) cruise control mode of operation is provided. In the cruise control mode of operation, if fueling to the engine is at approximately 100% of full throttle, the cruise control speed error (SE) exceeds a speed error reference (REF-SE) and a time derivative of output shaft speed (dOS/dt) is less than a first reference value REF-1), which reference value has a negative value, then shift decisions will be based on enhanced performance shift profile (E-F-G, U-V-W) similar to "kick-down" shift profiles.

12 Claims, 4 Drawing Sheets

| DRIVE RATIO | RATIO |
| --- | --- |
| 1 | 12.70 |
| 2 | 10.60 |
| 3 | 8.87 |
| 4 | 7.34 |
| 5 | 6.12 |
| 6 | 5.11 |
| 7 | 4.27 |
| 8 | 3.53 |
| 9 | 2.98 |
| 10 | 2.49 |
| 11 | 2.08 |
| 12 | 1.72 |
| 13 | 1.44 |
| 14 | 1.20 |
| 15 | 1.00 |
| 16 | .83 |
| LOW R | 11.69 |
| HIGH R | 8.15 |

*FIG. 3*

AMT CRUISE CONTROL MODE SHIFT LOGIC

BACKGROUND OF THE INVENTION

1. Field of the Invention

The present invention relates to vehicular automatic transmission systems providing a plurality of gear reduction ratios, such as fully or partially automatic mechanical transmission (AMT) systems and to control systems/methods therefor. In particular, the present invention relates to control systems and methods for vehicles with throttle controlled engines and mechanical automatic transmissions wherein gear selection and shift decisions are made and executed upon measured and/or calculated parameters such as transmission output shaft or vehicle speed, transmission input shaft and engine speed, throttle position, calculated engine speed in a potentially engageable ratio, and the like. More particularly, the present invention relates to automatic transmission control systems of the type described above having a selectable mode of operation, usually referred to as a "cruise control" mode of operation, wherein a selected vehicular speed is automatically maintained and operator manipulation of the manual fuel throttle setting device is not required.

2. Description of the Prior Art

The use of automatic transmission of both the automatic mechanical type utilizing positive clutches and of the planetary gear type utilizing frictional clutches is well known in the prior art as are the control systems therefor. Electronic control systems for automatic transmissions wherein gear selection and shift decisions are made based upon certain measure and/or calculated parameters such as vehicle speed, engine speed, rate of change of vehicle speed, rate of change of engine speed, throttle position, rate of change of throttle position, full depression of the throttle (i.e. "kick-down"), actuation of the vehicle brake mechanism, currently engaged gear ratio, and the like, are well known in the prior art. Examples of such automatic transmission control systems for vehicles may be seen by reference to U.S. Pat. Nos. 3,942,393; 3,974,720; 4,028,929; 4,039,061; 4,073,203; 4,038,889; 4,226,295; 4,253,348; 4,361,060; 4,595,986; 4,551,802; 4,576,065, 4,722,248 and 4,852,006, the disclosures of all of which are hereby incorporated by reference.

Control systems/methods for automated transmission systems having a selectable mode of operation (usually referred to as a "cruise control" mode of operation) wherein a selected vehicle speed is automatically maintained without requiring the operator to manually control a fuel throttle setting device or to select or implement transmission shifts, are also well known in the prior art for both automotive and heavy duty truck vehicles.

While the prior art control systems/methods for automatic mechanical transmission systems are effective to control an automatic mechanical transmission system by selecting and implementing shifts into desirable gear ratios, such automatic control systems/methods were not totally satisfactory when incorporated with an operator selectable cruise control mode of operation as, when operating in such mode of operation, the operator does not utilize the vehicle throttle pedal and thus the enhanced performance "kick-down" shift profiles are not available.

SUMMARY OF THE INVENTION

In accordance with the present invention, the drawbacks of the prior art have been overcome or minimized by providing a control system and method, preferably an electronic control system, for automatic transmissions, such as automatic/semi-automatic mechanical transmissions, wherein gear selection and shift decisions are made and executed upon measured and/or calculated parameters such as current input shaft or engine speed, throttle position, output shaft or vehicle speed and/or the rate of change thereof and/or expected engine speed or vehicle speed at the completion of a potential shift and wherein the predetermined program by which shift commands are generated has a selectable (cruise control) mode wherein a selected vehicle speed is automatically maintained without requiring operator manipulation of the throttle pedal and wherein, under certain sensed conditions, will utilize the shift profiles associated with "kick-down" are utilized to provide an enhanced vehicle performance.

The above is accomplished in a control system for an automatic mechanical transmission system wherein preferably the vehicle operator, by fully depressing the vehicle throttle pedal beyond the position associated with maximum fueling of the engine, i.e. in the "kick-down" or "ride through detent" position, can cause the system controller to modify the shift profiles to provide a maximum enhanced vehicle performance. Typically, this involves increasing the engine speeds at which both upshifts and downshifts from the currently engaged ratio will be commanded.

In the operator selectable cruise control mode of operation, as moving the throttle pedal to the kick-down position is not possible, a sensed parameter indicative of vehicle speed, such as output shaft speed, is sensed as is the first derivative thereof with respect to time. If the first derivative of output shaft speed with respect to time is less than a first reference, where said first reference has a negative value, while the transmission system is operating in the operator selected cruise control mode of operation, fueling of the engine is at a maximum value, and speed error (cruise control reference vehicle speed minus actual vehicle speed) exceeds an error reference value, then the control system will modify the shift profiles by which shift decisions are made from the shift profiles utilized for full (100%) fueling of the engine to the "kick-down" shift profiles wherein the engine speeds at which both upshift and downshifts will be commanded is raised.

The logic will remain in the "kick-down" mode until cruise control is cancelled, fueling of the engine is less than the maximum value, speed error becomes less than the error reference value or vehicle acceleration exceeds a second positive reference value.

Accordingly, it is an object of present invention to provide a new and improved control system and method for automatic mechanical transmission systems having a selectable cruise control mode of operation wherein under certain sensed operating conditions, high performance shift profiles are implemented.

This and other objects and advantages of the present invention will become apparent from a reading of the detailed description of the preferred embodiment taken in connection with the attached drawings.

BRIEF DESCRIPTION OF THE DRAWINGS

FIG. 3 is a table illustrating the ratio of input shaft speed to output shaft speed of a typical automatic mechanical transmission system in the various drive ratios thereof.

DESCRIPTION OF THE PREFERRED EMBODIMENT

Figure 1:
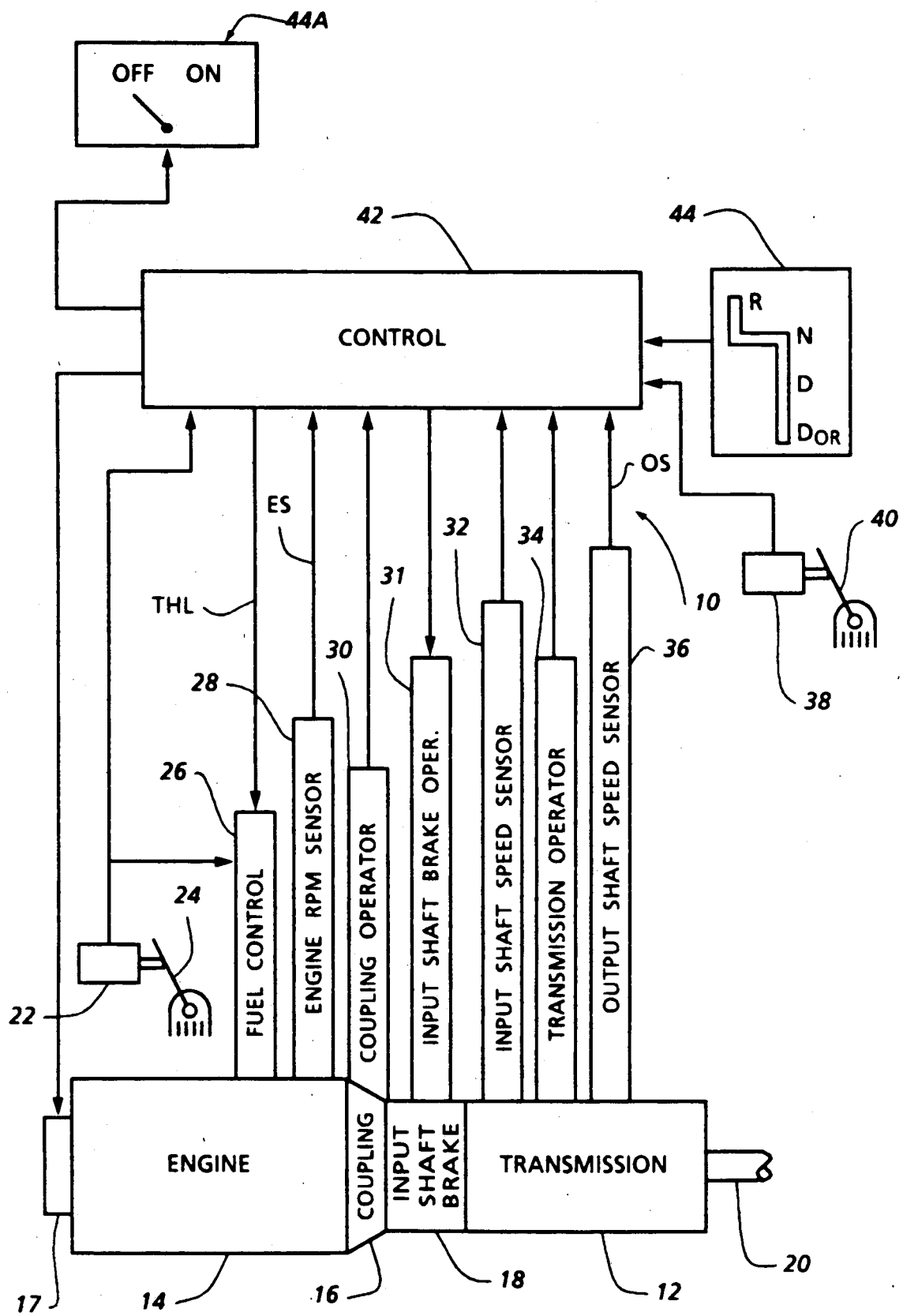
FIG. 1 is a schematic illustration of the components and interconnections of the automatic mechanical transmission control system of the present invention.

FIG. 1 schematically illustrates an automatic mechanical transmission system 10 including an automatic multi-speed compound change gear transmission 12 driven by a fuel controlled engine 14, such as a well known diesel engine, through a coupling such as torque convertor and/or master clutch 16. An engine brake such as an exhaust brake 17 for retarding the rotational speed engine 14 and/or an input shaft brake 18 which is effective to apply a retarding force to the transmission input shaft upon disengagement of coupling 16 may be provided as is known in the prior art. The output of automatic transmission 12 is output shaft 20 which is adapted for driving connection to an appropriate vehicle component such as the differential of a drive axle, a transfer case, or the like as is well known in the prior art.

The above mentioned power train components are acted upon and monitored by several devices, each of which will be discussed below. These devices include a throttle pedal position or throttle opening monitor assembly 22 which senses the position of the operator controlled throttle device 24, a fuel control device 26 for controlling the amount of fuel to be supplied to engine 14, and engine speed sensor 28 which senses the rotational speed of the engine, a coupling operator 30 which engages and disengages coupling clutch 16 and which also supplies information as to the status of the coupling, an input brake operator 31, a transmission input shaft speed sensor 32, a transmission operator 34 which is effective to shift the transmission 12 into a selected gear ratio and to provide a signal indicative of the gear neutral condition and/or the currently engaged gear ratio, and a transmission output shaft speed sensor 36. A vehicle brake monitor 38 senses actuation of the vehicle brake pedal 40.

It is understood that clutch 16 could be replaced by a hydromechanical device, such as a torque converter, and that such torque converter could be equipped with by-pass, lock-up and/or disconnect devices.

The above mentioned devices supply information to and/or accept commands from a central processing unit 60 or control 42. The central processing unit 42 may include analog and/or digital electronic calculation and logic circuitry, the specific configuration and structure of which forms no part of the present invention. The central processing unit also receives information from a shift control assembly 44 by which the vehicle operator may select a reverse (R), neutral (N), on-highway forward drive (D) or off-road forward drive ($D_{OR}$) mode of operation of the vehicle. An electrical power source (not shown) and/or a source of pressurized fluid (not shown) provides electrical and/or pneumatic power to the various sensing, operating and/or processing units. Drive train components and controls therefor of the type described above are known in the prior art and may be appreciated in greater detail by reference to above-mentioned U.S. Pat. Nos. 4,595,986; 4,576,065; 4,445,393; 4,361,060; 3,776,048; 4,038,889 and 4,226,295.

Sensors 22, 28, 32, 36, 38 and 40 may be of any known type or construction for generating analog or digital signals proportional to the parameter monitored thereby. Similarly, operators 17, 18, 26, 30 and 34 may be of any known electric, hydraulic, pneumatic or electro-pneumatic type for executing operations in response to command signals from the central processing unit 42 and/or for providing input signals thereto. Fuel control 26 will normally supply fuel to engine 14 in accordance with the operator setting of throttle pedal 24 but may supply a lessor (fuel dipped) or greater (fuel boost) amount of fuel in accordance with commands from the central processing unit 42.

Clutch operator 30 is preferably controlled by the central processing unit 42 and may engage and/or disengage master clutch 16 as described in above-mentioned U.S. Pat. No. 4,081,065. Of course, operator 30 could also be an operator for torque converter by-pass, lock-up and/or disconnect devices as illustrated in allowable U.S. Pat. No. 4,784,019, the disclosure of which is hereby incorporated by reference. Transmission 12 may include synchronizing means, such as an accelerator and/or a brake mechanism as described in U.S. Pat. Nos. 3,478,851 and 4,676,115, the disclosures of both of which are hereby incorporated by reference. Transmission 12 is preferably, but not necessarily of the twin countershaft type as is seen in U.S. Pat. Nos. 3,105,395; 4,648,290, 4,735,109 and/or 4,754,665, the disclosures of which are incorporated by reference.

Another input by the operator to the central processing unit is a cruise control select switch 44A by which the operator may select operation in the cruise control mode of operation.

In addition to direct inputs, the central processing unit may be provided with circuitry for differentiating the input signal from sensors 28, 32 and/or 34 to provide a calculated signal indicative of the rate of acceleration of the engine, input shaft and/or output shaft, means to compare the input signals from sensor 32 and 36 to calculate a current engaged gear ratio, circuit means to compare the current engaged gear ratio with the signal from sensor 36 to provide a calculated engine speed, means to sense full throttle, means to calculate an expected engine speed in a given engaged ratio and at a calculated or sensed output shaft speed, and the like.

In the automatic mechanical transmission system illustrated in FIG. 1, a purpose of the central processing unit is to select, in accordance with predetermined logic rules and current or stored parameters, the optimum gear ratio at which the transmission should be operating and, if necessary, to command a gear change, or shift, into the selected optimal gear ratio based upon the current and/or stored information. FIG. 3 illustrates the ratio of the input shaft speed to the output shaft speed in a 16-forward speed and 2-reverse drive ratio type of transmission typically utilized with heavy duty vehicles and suitable for use in the automatic mechanical transmission system 10 illustrated in FIG. 1. Although not necessary, it may be seen that the steps or splits between forward ratios are approximately twenty percent (20%).

As indicated above, one of the principle functions of the control unit 42 of the automated mechanical transmission system is to make decisions as to the proper gear ratio that should be selected and engaged in transmission 12 based upon driver demands and vehicle operating conditions. Ideally, transmission system 10 utilizes an electronic control unit 42 preferably microprocessor based, which can be programmed to enhance specific vehicle characteristics.

Figure 2:
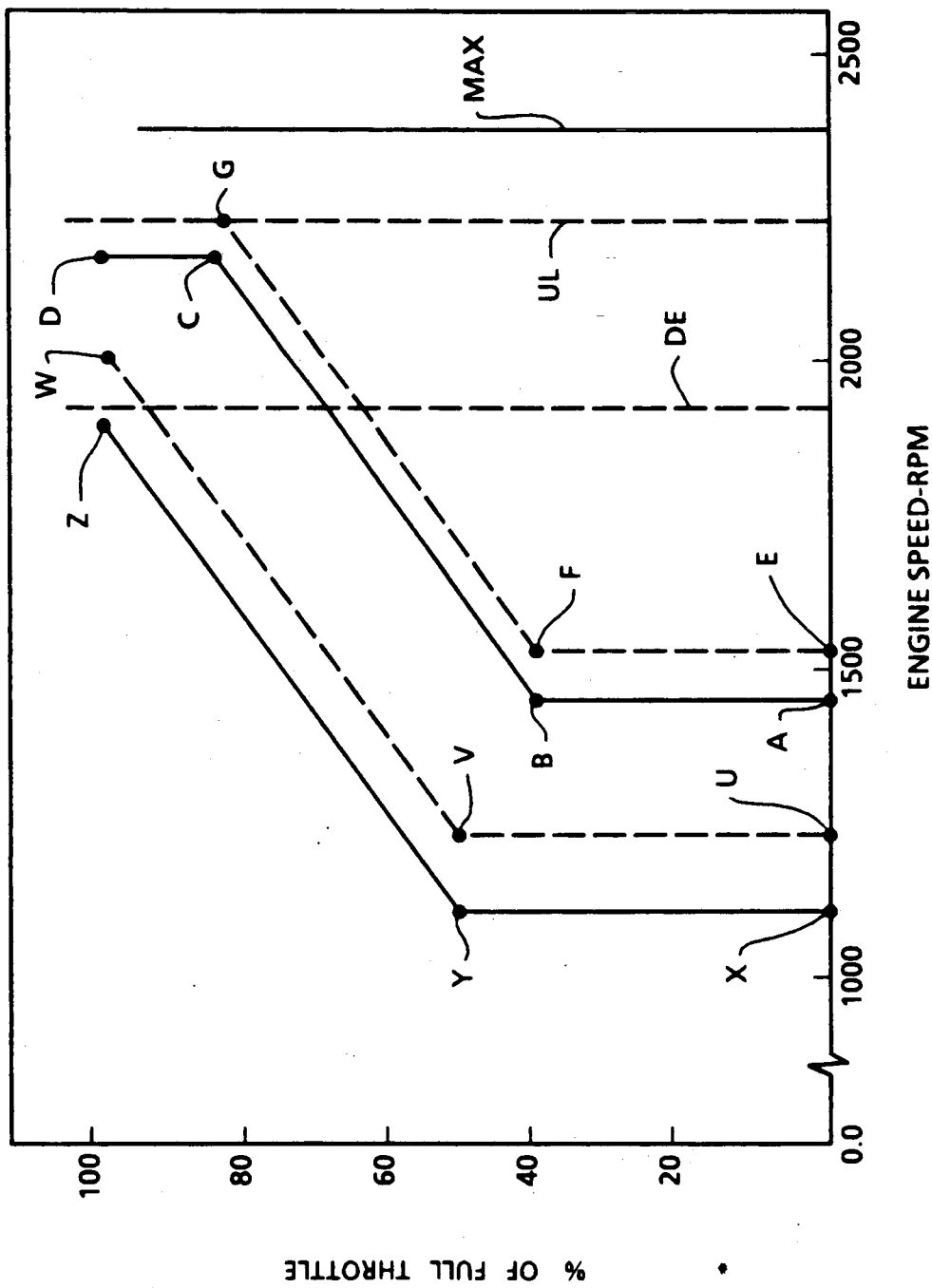
FIG. 2 is a graph of engine speed versus throttle position illustrating shift patterns, or shift profiles, of the type generated/calculated by control systems of automated mechanical transmissions.

One method by which shift decisions are made is for the central processing unit program or logic rules to generate shift patterns, or shift point profiles, as seen in FIG. 2. Alternatively, calculation and/or look-up tables may be utilized. The shift point profiles generated by the central processing unit will determine if the transmission should remain in the currently engaged gear ratio, should be upshifted to at least the next highest gear ratio or should be downshifted to at least the next lower gear ratio. The shift point profiles are determined by a predetermined program acting upon current or stored information and are usually selected to provide a compromise between operation at the most fuel efficient possible gear ratio and operation in a gear ratio providing optimal performance and/or comfort characteristics of the vehicle. Shift point profiles illustrated in FIG. 2 are a function of throttle position, expressed as a percentage of maximum throttling position, and of engine speed. The engine speed may be directly sensed or, preferably, is a calculated engine speed (i.e based upon output shaft speed and engaged gear ratio) which will not vary during a shift transient as is known in the prior art.

As used herein a "lower gear ratio" or "lower drive ratio" will refer to a gear or drive ratio having a higher ratio of input shaft speed to output shaft speed. For example, ninth (9th) gear is lower than tenth (10th) gear and the shift from tenth gear to ninth gear is a downshift. Similarly, a shift directly from tenth gear to eighth gear is a skip downshift wherein one ratio (i.e. 9th speed) is skipped. A shift directly from tenth speed to seventh speed is a skip downshift wherein two ratio steps are skipped.

The control 42 utilizes logic rules incorporating at least two modes or sets of shift profiles. These are, a normal operating mode, usually referred to as the "over the road" mode and an enhanced performance mode often referred to as a "kick-down" mode. Both the on highway (A-B-C-D and X-Y-Z) and the kick-down (E-F-G and U-V-W) shift profiles provide the basis for shifting to transmission 12 as a function of speed. Both sets of profiles are primarily derived from the characteristics of the engine including the effects of all engine driven auxiliaries. The engine speed signal, shown in terms of engine RPM, is preferably derived by multiplying the transmission output shaft signal by the numeric value of the gear value of the drive ratio currently selected by the control electronics. Throttle position is shown as a percentage of full throttle from zero percent (0%) to one hundred percent (100%).

As "kick-down" requires that the throttle be fully depressed, only the upper ends of the kick-down shift profiles are of a practical interest.

As is known, assuming operation in the normal or over the highway mode of operation, operating conditions within the space bounded by the downshift line X-Y-Z and the upshift line A-B-C-D, no gear change is required, for operating conditions at or to the right of the upshift line A-B-C-D, an upshift to at least the next highest gear ratio is required and for operating conditions at or to the left of downshift line X-Y-Z, a downshift to at least the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gear ratios, the greater the desirability of separate shift point profiles for each currently engaged gear ratio.

Other sensed or calculated monitored speeds, such as input shaft speed, output shaft speed, vehicle speed or the like, may be substituted for engine speed in the shift point profiles illustrated in gear 2. Also, the upshift and downshift profile lines are preferably not static but are dynamic. Dynamically moving shift point profile lines are known, and are discussed in greater detail in above-mentioned U.S. Pat. No. 4,361,060. Typically, the shift point lines are moved in response to current and/or stored information such as direction of the last shift, acceleration of the vehicle, acceleration of the engine, rate of change of throttle position, operation of the vehicle brake or the like.

As is discussed in above-mentioned U.S. Pat. No. 4,361,060 it is well known to provide the operator with the means by which to select enhanced performance modes of operation. Typically, the means provided the operator is a switch closed by the operator's movement of the throttle pedal beyond the full throttle position thereof and is typically referred to as the kick-down or ride through detent position of the throttle. Under ride through detent or kick-down conditions, both the down enabled (DE) and the upshift limit (UL) speeds will be increased. This provision permits additional control of gear selection which is particularly advantageous on grades. With the normal upshift limit settings, an upshift will result in lower engine horse power availability at the lower engine speed. Thus, on grades, for example, it would be possible for upshifts to result in insufficient power to maintain vehicle speed. This problem is further aggravated by the fact that under these conditions vehicle speed may drop significantly during the shift.

By raising the upshift limit (UL) this problem can be overcome. Typically, in a governed diesel engine, the upshift limit setting can be moved to the region of engine governor droop such that there will always be increased horse power or torque available after the upshift. Normally, this involves consideration of vehicle deceleration during the shift.

Increasing the down enabled (DE) setting allows the driver to force early downshifts. This is advantageous when the driver anticipates a grade on which the downshift will be required. The early downshift will resolve in a minimum reduction of vehicle speed. The ride through detent Position can also be utilized to provide enhanced acceleration in situations such as passing another vehicle.

In accordance with the present invention, the advantages of utilizing the high performance, i.e., kick-down type, shift profiles may be obtained even when the vehicle is in the operator selected cruise control mode of operation without requiring the operator to manipulate the vehicle throttle Pedal. This is accomplished by taking a value and a time derivative of vehicle speed or of a parameter indicative of engine speed, preferably the first derivative with respect to time, and comparing the sensed vehicle speed to the cruise control setting speed to determine a speed error (SE) which is compared to a speed error reference value (REF-SE), and comparing the time derivative of vehicle speed to at least one reference value (REF-1) having a negative value. Typically, the output shaft speed signal (OS) is the signal utilized as a signal indicative of vehicle speed.

If the speed error (SE) exceeds the speed error reference value (REF-SE) and the change in vehicle speed with respect to time (dOS/dt) is less than the predetermined reference value (REF-1) while the engine is receiving substantially full fuel, this is an indication that the vehicle is experiencing a high resistance to forward motion and that utilizing the high performance kickdown shift profiles would be appropriate.

Additionally, the time derivative of vehicle (i.e. output shaft) speed may be compared to a second reference value (REF-2) having a positive value and, if the vehicle speed time derivative exceeds said second reference value, cancellation (i.e. resetting) of a previous selection of the kick-down shift profiles may be appropriate.

It is important to understand that the shift point profiles are dependent upon the throttle position as well as the engine speed. Other than selecting a reverse, neutral, or a forward drive mode of operation of the vehicle by manipulation of selector 44, the operator's only input to the transmission system is his manipulation of the throttle Pedal or other fuel control as the case may be. Accordingly, by setting shift profiles and modifying same in partial response to throttle position, the operator's desires are accounted for at a central processing unit 42 in deciding the optimum gear ratio at which the transmission 12 is to operate. Upon selecting a cruise control mode of operation, this input to the central processing unit, especially as to the need for enhanced performance by utilizing the kick-down shift profiles, is normally not available.

With a change speed transmission, the ratio of engine speeds between any two gears is fixed by the ratio step or split (ratio and gear ratios). With profiles located as previously described, each upshift will lead to an operating point located on or near the downshift lines or the next higher gear ratio and vice versa. Huntinq between the gears would be inevitable. Some additional separation between the upshift and the downshift profiles is desirable and acceptable; however, sufficient separation to totally eliminate hunting can be result in an undesirable reduction in the fuel economy. As described in above-mentioned U.S. Pat. No. 4,361,060, to overcome this problem the control moves the shift profiles as a consequence of a shift. After an upshift, the downshift profile is moved towards a lower engine speed; and after a downshift, the upshift profiles are moved towards a higher engine speed, for a predetermined interval of time and/or until the occurrence of a predetermined event.

Preferably, the engine speed is a calculated rather than an actual engine speed, corresponding to the engine speed at drive train lock up conditions, which is determined by multiplying the output shaft speed by the appropriate gear ratio. The use of a calculated rather than an actual engine speed is preferred as actual engine speeds will vary during shift transients and the like.

It is noted, of course, that while in the preferred embodiment the values of output shaft speed and the first derivative of output shaft speed with respect to time are compared to reference values to determine if operation with the high performance kick-down shift profiles is appropriate, assuming drive train lock up or substantial lock up conditions, the values of transmission input shaft speed and/or countershaft speeds are indicative of, or allow the calculation of, vehicle speed.

Figure 4:
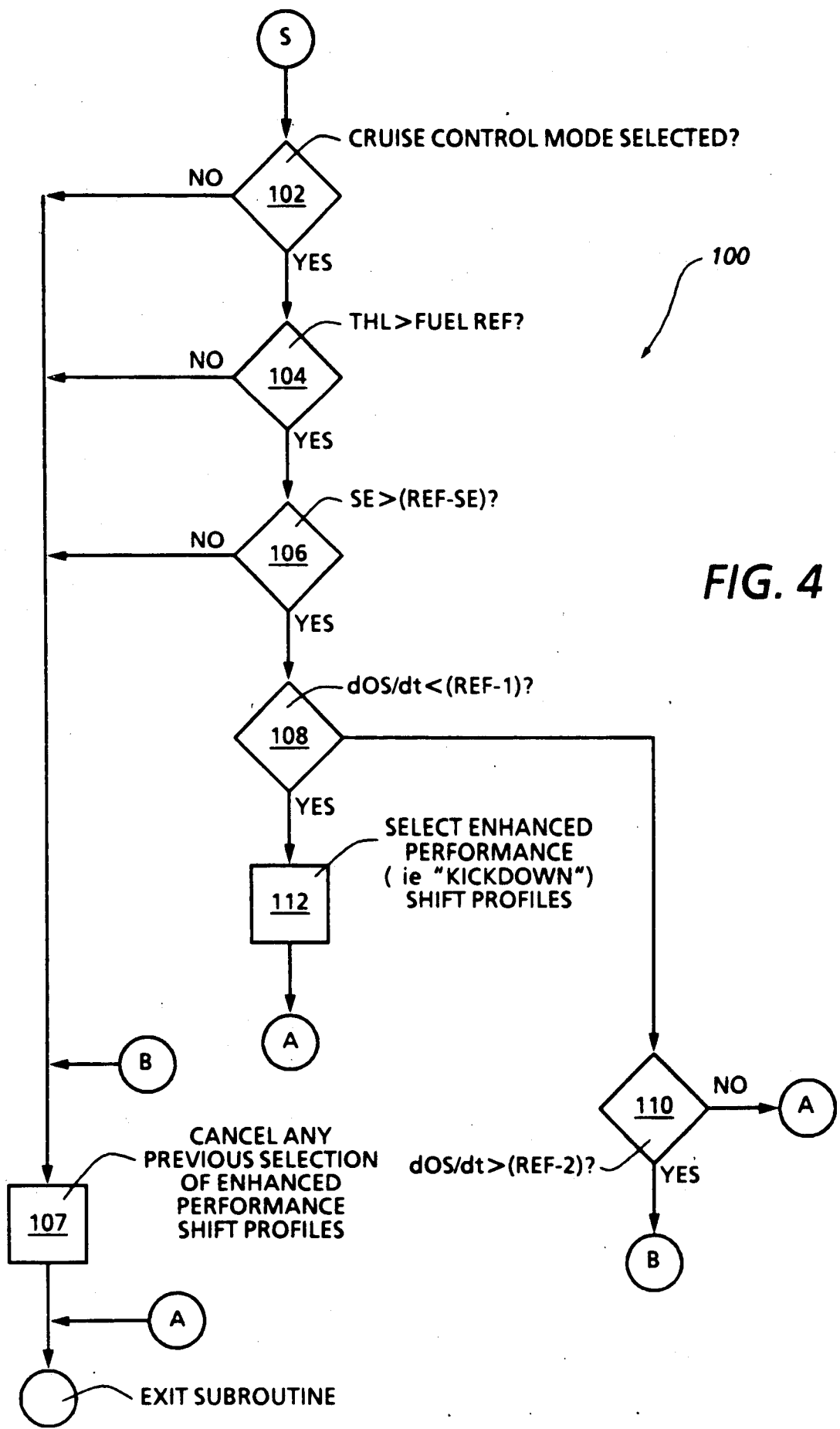
FIG. 4 is a schematic illustration, in the form of a flow chart, illustrating the preferred manner of practicing the present invention.

Symbolic illustration of the present invention, in flow chart format, may be seen by reference to FIG. 4. Starting at point S, the AMT cruise control shift logic subroutine 100 of the present invention determines at 102 if the cruise control mode has been selected, at 104 if the fuel being supplied to the engine is greater than or equal to a fuel reference which reference is preferably at or about 100% of the full fueling value and at 106 of the speed error (SE) exceeds the reference value (REF-SE). If either of these conditions is not true, at 107 previous selections if enhanced performance shift profile operation are cancelled and the subroutine will be exited. At 108 the first derivative of output shaft speed with respect to time, or a value indicative thereof, is sensed and/or calculated and is compared to a reference (REF-1) where REF-1 is a negative value corresponding to a vehicle slow down rate expected on a severe on a grade condition. If the time derivative of output shaft speed is not less than the reference value REF-1, at 110 it is determined if vehicle acceleration exceeding a second positive reference value (REF-2) requires cancelling of previous selections of enhanced performance shift profile operation prior to exiting the subroutine. If the first derivative value is less than the first reference value, indicating greater than a reference vehicle speed decay rate, at 112 the subroutine will cause optimum engaged gear determination and shift decisions to be made on the basis of enhanced performance (i.e. kickdown) shift profiles. The subroutine is then exited.

Although the present invention has been set forth with a certain degree of particularity, it is understood that various modifications are possible without departing from the spirit and scope of the invention as hereinafter claimed.

I claim:

1. An automated mechanical transmission system for vehicles having a fuel controlled engine (14), a throttling control means (26) for controlling the amount of fuel supplied to the engine and a multi-speed mechanical transmission (12) having a plurality of gear ratio combinations selectively engageable between a transmission input shaft and a transmission output shaft (20), said transmission input shaft being operatively connected to said engine by a coupling device (16), said transmission system including an information processing unit (42) having means for receiving a plurality of input signals including at least an input signal (OS) indicative of the vehicle speed, said processing unit including means of processing said input signals including determining the value of a time derivative of said signal indicative of vehicle speed and for processing said input signals in accordance with predetermined logic rules to select a desirable gear ratio for a given combination of input signals and for generating command output signals whereby said transmission system is operated in accordance with said predetermined logic rules, said predetermined logic rules including a standard mode of operation wherein shift decisions are based upon a set of standard shift profiles, and an enhanced performance mode of operation wherein shift decisions are based upon a set of enhanced performance shift profiles, and means associated with said transmission system effective to actuate said transmission, fuel throttling means and coupling means to effect engagement of one of said gear ratio combinations in response to said output signals from said processing unit:

said predetermined logic rules having an operator selectable (44A) cruise control mode of operation wherein the speed of said vehicle is automatically maintained at a selected value, including automatic selection of fueling to the engine and engaged ratio of said transmission, and said processing means on the basis of said predetermined logic rules:

(i) compares said time derivative of said signal indicative of vehicle speed to a first reference value having a negative value, (ii) compares vehicle speed to the selected value to calculate a vehicle speed error and compares said vehicle speed error to a speed error reference value (REF-SE) and (iii) compares the amount of fuel (THL) being supplied to said engine to a fuel reference value and, if (i) said cruise control mode of operation is selected, (ii) said time derivative is less than said first reference value, (iii) said speed error (SE) exceeds said vehicle speed error reference value (REF-SE) and (iv) said amount of fuel is greater than said fuel reference value, causes said predetermined logic rules to base shift decisions upon an enhanced performance set of shift profiles.

2. The control system of claim 1 wherein said enhanced performance shift profiles require downshifts at a higher engine speed than said standard shift profiles.

3. The control system of claims 1 or 2 wherein said time derivative is the first derivative with respect to time of the currently sensed output shaft speed (OS).

4. The control system of claims 1 or 2 wherein said transmission system includes a ride through detent sensor for sensing operator selection of operation in a kick-down mode and wherein said enhanced performance shift profiles are the profiles utilized in the kick-down mode of operation.

5. The control system of claims 1 or 2 wherein said fuel reference value corresponds to maximum fueling of said engine.

6. The control system of claims 1 or 2 wherein said time derivative is compared to a second reference value (REF-2) having a positive value and, if said time derivative exceeds said second reference value, said predetermined logic rules cause said shift decisions not to be based upon said enhanced performance shift profiles.

7. A method for controlling an automated mechanical transmission system for vehicles having a fuel controlled engine (14), a throttling control means (26) for controlling the amount of fuel supplied to the engine and a multi-speed mechanical transmission (12) having a plurality of gear ratio combinations selectively engageable between a transmission input shaft and a transmission output shaft (20), said transmission input shaft being operatively connected to said engine by a coupling device (16), said transmission system including an information processing unit (42) having means for receiving a plurality of input signals including at least an input signal (OS) indicative of vehicle speed, said processing unit including means of processing said input signals including determining the value of a time derivative of said signal indicative of vehicle speed and for processing said input signals in accordance with predetermined logic rules to select a desirable gear ratio for a given combination of input signals and for generating command output signals whereby said transmission system is operated in accordance with said predetermined logic rules, said predetermined logic rules including a standard mode of operation wherein shift decisions are based upon a set of standard shift profiles, and an enhanced performance mode of operation wherein shift decisions are based upon a set of enhanced performance shift profiles, and means associated with said transmission system effective to actuate said transmission, fuel throttling means and coupling means to effect engagement of one of said gear ratio combinations in response to said output signals from said processing unit:

said predetermined logic rules having an operator selectable (44A) cruise control mode of operation wherein the speed of said vehicle is automatically maintained at a selected value, including automatic selection of fueling to the engine and engaged ratio of said transmission, and said method characterized by:

(i) comparing said time derivative of said signal indicative vehicle speed to a first reference value having a negative value, (ii) comparing vehicle speed to the selected value to calculate a vehicle speed error (SE) and comparing said vehicle speed error to a speed error reference value (REF-SE and (iii) comparing the amount of fuel (THL) being supplied to said engine to a fuel reference value and, if (i) said cruise control mode of operation is selected, (ii) said time derivative is less than said first reference value, (iii) said vehicle speed error (SE) exceeds said speed error reference value (REF-SE) and (iv) said amount of fuel is greater than said fuel reference value, causing said predetermined logic rules to base shift decisions upon an enhanced performance set of shift profiles.

8. The control method of claim 7 wherein said enhanced performance shift profiles require downshifts at a higher engine speed than said standard shift profiles.

9. The control method of claims 7 or 8 wherein said time derivative is the first derivative with respect to time of the currently sensed engine speed.

10. The control method of claims 7 or 8 wherein said transmission system includes a ride through detent sensor for sensing operator selection of operation in a kick-down mode and wherein said enhanced performance sift profiles are the profiles utilized in the kick-down mode of operation.

11. The control method of claims 7 or 8 wherein said fuel reference value corresponds to maximum fueling of said engine.

12. The control method of claims 7 or 8 additionally comprising comparing said time derivative to a second reference value (REF-2) having a positive value and, if said time derivative exceeds said second reference value, causing said shift decisions not to be based upon said enhanced performance shift profiles.

* * * * *